United States Patent [19]

Kowalski et al.

[11] 4,245,764
[45] Jan. 20, 1981

[54] ARTICLE CARRIER HAVING VARIABLY POSITIONABLE CROSS-RAIL BRACKET

[75] Inventors: Daniel J. Kowalski, Ortonville; Douglas J. Ferguson, Davisburg, both of Mich.

[73] Assignee: Four Star Corporation, Troy, Mich.

[21] Appl. No.: 24,994

[22] Filed: Mar. 29, 1979

[51] Int. Cl.³ ............................................... B60R 9/04
[52] U.S. Cl. .................................... 224/321; 224/324; 224/325
[58] Field of Search ............... 224/321, 309, 319, 324, 224/325, 322, 326, 329, 330; 248/214, 499

[56] References Cited

U.S. PATENT DOCUMENTS

| 3,381,866 | 5/1968 | Wickett | 224/322 X |
| 3,542,264 | 11/1970 | Meyer et al. | 224/326 X |
| 3,833,160 | 9/1974 | Andersson | 224/324 X |
| 4,099,658 | 7/1978 | Bott | 224/326 |
| 4,132,335 | 1/1979 | Ingram | 224/324 |

*Primary Examiner*—Steven M. Pollard
*Attorney, Agent, or Firm*—Reising, Ethington, Barnard, Perry & Brooks

[57] ABSTRACT

A bracket which is transversely positionable along a cross-rail is disclosed. The bracket surrounds the cross-rail in a slidable manner and has an opening integral therewith to threadingly receive a tie-down strap. The positionable bracket is releasably lockable to the cross-rail for securing articles such as luggage straps to the cross-rail.

1 Claim, 5 Drawing Figures

ARTICLE CARRIER HAVING VARIABLY POSITIONABLE CROSS-RAIL BRACKET

BACKGROUND OF THE INVENTION

I. Field of the Invention

The present invention pertains to a transversely positionable cross-rail mounted bracket for article carriers. More particularly, the present invention pertains to a transversely positionable bracket which is slidable along a cross-rail for vehicle related article carriers. Even more particularly the present invention concerns a transversely positionable bracket movable along a transverse cross-rail for vehicle associated article carriers for supporting articles such as luggage, skis and other articles and having a locking means that is used to secure the transversely positionable bracket to the cross-rail.

II. Prior Art

In U.S. Pat. No. 4,132,335, issued Jan. 2, 1979, the disclosure of which is included by reference, there is disclosed a vehicle associated article carrier, such as a luggage rack, ski rack, or the like which incorporates certain slidably adjustable brackets therewithin. According to the application the brackets are variably positionable along the length of a slotted track formed in an associated slat of the article carrier.

The brackets of the copending application, generally, comprise an upper section which is disposed above the slat, a lower section which is engageable with the track and slidable therewithin and means for urging a member into locking engagement with a wall of the track. A loop or other opening is provided on the upper section of the bracket to provide a mode of attachment thereto of a tie-down strap for securing articles to the article carrier. The transverse position of the attachment for the tie-down strap is fixed in the aforesaid application rendering it sometimes difficult to secure articles such as skis and bicycles to the top of the vehicle. The present invention as will be subsequently detailed, seeks to overcome this problem.

STATEMENT OF RELEVANT ART

To the best of applicant's knowledge, the following is believed to be the prior art most closely related to the present invention:

| U.S. Pat. Nos. | 3,677,451 | 2,753,095 |
|---|---|---|
| | 3,375,365 | 3,902,641 |
| | 3,165,353 | 2,914,231 |
| | 3,064,868 | 2,628,123 |
| | 3,988,253 | 2,499,136 |
| | 2,783,367 | 3,719,313 |
| | 3,828,993 | 3,468,460 | as well as the letters patent hereinabove referred to.

SUMMARY OF THE INVENTION

As contemplated in the present invention, in a preferred embodiment, a cross-rail is secured between a pair of oppositely disposed rail-receiving brackets and a pair of transversely movable cross-rail brackets surrounding the cross-rail are disposed between the brackets. A loop formed with each cross-rail bracket allows a tie-down strap to be threaded therethrough to secure articles such as skis, bicycles, luggage, and the like to the cross-rail.

The transversely positionable cross-rail bracket hereof generally comprises:

(a) means for variably, adjustably positioning the bracket along a cross-rail provided on an article carrier, (b) an upper section interconnected to the positioning means, incorporating means for detachably securing a tie-down strap thereto, and (c) means for releasably locking the tie-down bracket to the cross-rail.

As contemplated by the practice of the present invention, the rail receiving bracket is slidingly, adjustably disposed in a track or channel formed in a vehicle related slat. The rail-receiving bracket incorporates a projection, either male or female, to which is detachably mounted an article carrier cross-rail. The transversely movable cross-rail bracket surrounds the cross-rail and is releasably lockable thereto.

The rail-receiving bracket has a locking means which, preferably, includes a wedge secured to a rotatable disc which extends through the positioning means. The disc is rotatable and is, optionally, ratcheted to prevent accidental loosening. As the disc is rotated in a first direction the wedge is urged into engagement with a wall of the track to lock the bracket into position. Rotation of the disc in the counter or second direction disengages the wedge from the track wall to permit movement of the rail-receiving bracket.

For a more complete understanding of the present invention reference is made to the following detailed description and accompanying drawing. In the drawing, like reference numbers refer to like parts throughout the several views, and wherein:

DESCRIPTION OF THE PREFERRED EMBODIMENT

Figure 1:
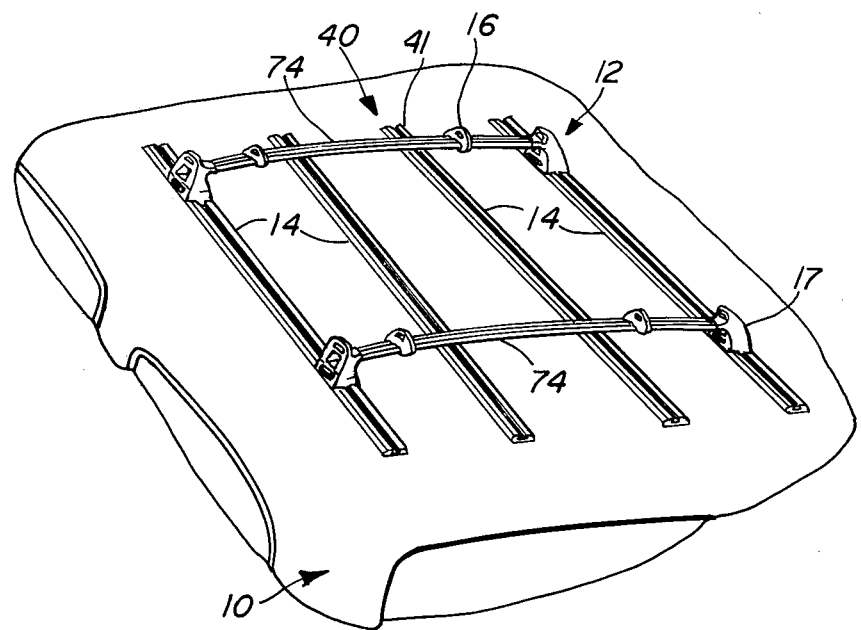
FIG. 1 is a broken perspective view of a vehicular associated article carrier incorporating a preferred embodiment of a movable cross-rail bracket in accordance with the present invention.

Now, and with reference to the drawing, there is depicted therein a movable cross-rail bracket 16 in accordance with the present invention as well as an article carrier 12 incorporating a movable rail-receiving bracket 17 and a cross-rail 74 for support of the movable cross-rail bracket 16. The cross-rail bracket 16 hereof, is movable transversely along the cross-rail and releasably lockable in any desired position therealong.

The cross-rail bracket 16 hereof, generally, comprises:

(a) a main body section surrounding the cross-rail and movable therealong; and (b) means for releasably locking the section to the cross-rail.

The present invention further comprises means for detachably mounting an article carrier tie-down strap to the cross-rail bracket.

Furthermore, and at the outset, it should be noted that, as used herein and in the appended claims, the term "article carrier" contemplates a luggage rack, ski rack, or similar type of vehicle-related or associated device. As is known to the skilled artisan, such devices, ordinarily, contemplate a plurality of spaced apart slats which support a load or article disposed thereon. Such devices, also, adopt and incorporate side rails, and stationary and/or movable cross-straps where appropriate. If required, stanchions are utilized to support the side rails and stationary cross-rails when employed. The article carriers are, usually, mounted to either the vehicle roof or trunk lid or deck. In the practice hereof, it is to be understood that the present invention is applicable to all such article carriers so long as the carrier, per se, can receive the movable cross-rail bracket as detailed subsequently.

Figure 3:
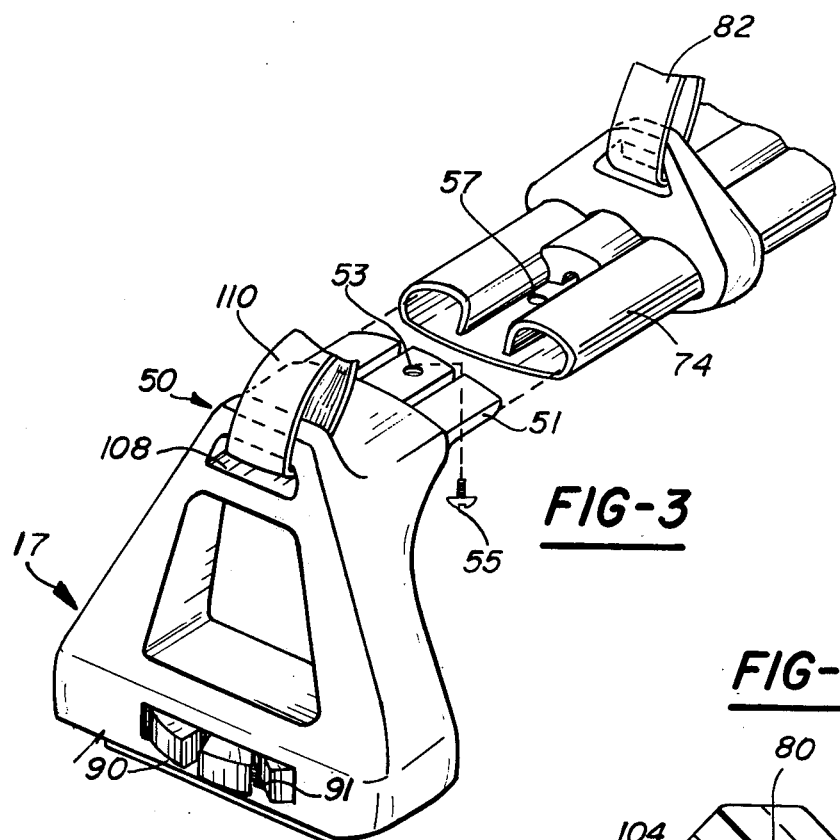
FIG. 3 is an exploded perspective view of the rail receiving bracket and the movable cross-rail bracket showing the preferred embodiment of the invention and a projecting male member to telescopingly engage a cross rail.
Figure 4:
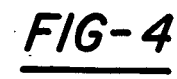
FIG. 4 is a cross-sectional view through the movable cross-rail bracket and cross-strap following a longitudinal plane.

Referring again to the drawing, the main body section or portion of the bracket 16 surrounds or envelopes the cross-rail 74 in a slidable manner. The main body section has a central opening configured substantially akin to and is slightly larger than the rail 74. This enables the bracket 16 to slide along the rail 74. The bracket 16 has a loop 80 formed above the main body section. The loop is adapted to threadingly receive a tie-down strap 82. The tie-down strap 82 is foldable back on itself through the loop 80 as shown in FIG. 3. Alternatively, the tie-down strap 82 can be attached to the loop 80 by any suitable means including rivets, threaded fasteners, adhesive bonding or the like. The loop 80 defines means for detachably mounting a tie-down strap to the bracket 16.

It is to be perceived that an article, such as a bicycle, luggage or the like can be placed upon the carrier 12, and tied down with the straps 82 which are threaded through the openings provided in the cross-rail brackets 16. The brackets 16 are adjustably positionable by sliding same along the cross-rail 74.

An aperture 76 is formed through the main body section of the bracket 16. A fastener, such as a screw 78 is insertable through the aperture 76 to secure the bracket against the cross rail 74. This prevents movement of the bracket.

As shown in the drawing the cross-rail 74 has a generally streamlined cross section to minimize wind resistance and drag when the vehicle is underway. A channel 96 is formed in the center of the cross-rail 74 along its length. The channel 96 has outwardly sloping sides 98 making the bottom of the channel 96 wider than the top. A rub strip 100 is configured to be insertable into the channel 96 and snugly retained therein. The rub strip 100 has an arcuate upper surface projecting above the cross-rail to provide a surface to rest articles upon. The rub strip 100 is made of resilient material such as rubber to provide a non-slip, scratch resistant, and non-abrasive surface against which articles to be retained by the carrier 12 can rest. The rub strip 100 has a pair of downward projecting legs 102 spaced apart by a recess 104. The legs 102 project downward and outward, the outward spacing across the legs exceeding the dimension created by the outward sloping sides 98 of the channel 96. The resiliency of the rub strip material allows the legs 102 to be squeezed together partially filling the recess 104 and allowing the rub strip 100 to be easily inserted into the channel 96. The outward sloping sides 98 and the outward sloping legs 102 cooperate to hold the rub strip 100 in the channel 96 in a removable manner. If the rub strip should be scuffed, cut, or otherwise damaged it can be readily removed and replaced without removing the cross-rail. Heretofore rub strips were mounted to slats and rails with lock seam arrangements. The cooperation between the legs 102 and the walls 98 obviates the need for the lock seam. In the previously used configuration, the rub strip was only insertable and removable from the end of the cross-rail. This requires removing the cross-rail from the bracket to remove or install the rub strip.

The cross-rail hereof can be formed of extruded aluminum, rolled sheet metal, or stamped sheet metal, or moulded reinforced plastic.

Referring again to the drawings, the article carrier depicted in FIG. 1 comprises a plurality of slats 14. The slats 14 are longitudinally extending members which are affixed to the vehicle body by any suitable mode, such as threaded fasteners (not shown) or the like.

Figure 5:
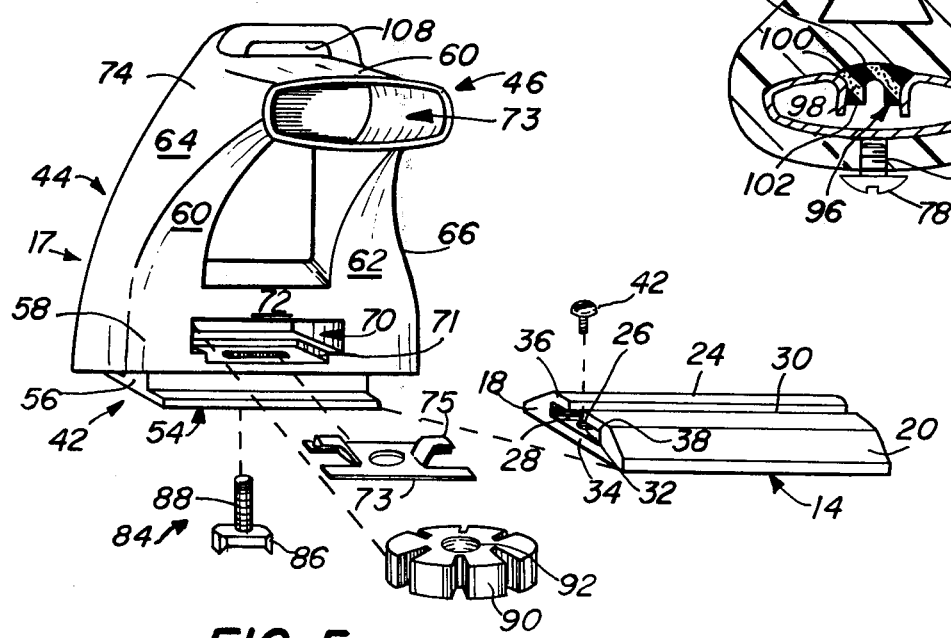
FIG. 5 is an exploded, perspective view of the rail receiving bracket and track-forming slot of an article carrier associated therewith.

In a preferred embodiment of the present invention, the article carrier 12 comprises at least one slat 14 adapted to receive a transversely movable tie-down bracket 17 of the type disclosed in U.S. Pat. No. 4,132,335. As disclosed in the patent, the slat 14 generally, comprises (FIG. 5) a member 20 having a substantially planar lower surface 18. The surface 18 is designed to be contiguous with the vehicle body when affixed thereto. The upper surface 24 of the slat 14 is provided with bracket-receiving means 26, such as a channel 28. The channel or track 28, in a preferred embodiment, includes a longitudinal slot 30 formed substantially along the extent of the upper surface and is formed downwardly therefrom. The slot 30 is in registry with and opens up into an enlarged guidepath 32. The guidepath is coextensive with the slot 28. The guidepath 32 includes a bottom wall 34 which defines a seat for a rail receiving bracket 17 in a manner to be described subsequently. The junction between the slot 30 and the guidepath 32 is defined by a pair of opposed inwardly directed shoulders 36, 38 respectively. The wall 34 and the shoulders 36, 38 cooperate to retain the rail-receiving bracket 17 in a fixed position when the rail receiving bracket is placed in a locked position.

The slat 14 can comprise, a formed sheet metal member, a solid or hollow interior extrusion or the like, as desired. The criticality to be attached to the slat is that it be provided with the longitudinally extending channel 28. Also, the slat 14, further, may comprise means 40 for limiting the longitudinal movement of the movable bracket 17 in the track 28. The stop means 40 can comprise an end cap 41 journalled onto one end of the slat 14 or an obstruction such as an oval head screw 42 can be disposed in the channel 28, as shown. The obstruction disrupts the path of travel of the bracket to prevent passage therepast.

As heretofore noted, the slat 14 receives the rail receiving bracket 17. The rail-receiving bracket 17 (FIG. 5) comprises (a) a base section 42 for adjustably positioning the rail receiving bracket along the extent of the track 28, (b) an upper section 44 integral with the base, the upper section comprising means 46 for receiving the cross-rail 74, and (c) means for releasably locking the rail receiving bracket in position. The rail receiving bracket 17 hereof may, also, comprise means 50 for detachably mounting an article carrier tie-down strap 110 thereto.

With more particularity, the base section 42 is slidably movable in the track 28. The base may have any desired configuration by which it may slide in the track. Preferably, though, the base section is configured analogously to the track 28. This enables the lower body 54 to be slid, with facility, along the length of the guidepath.

Figure 2:
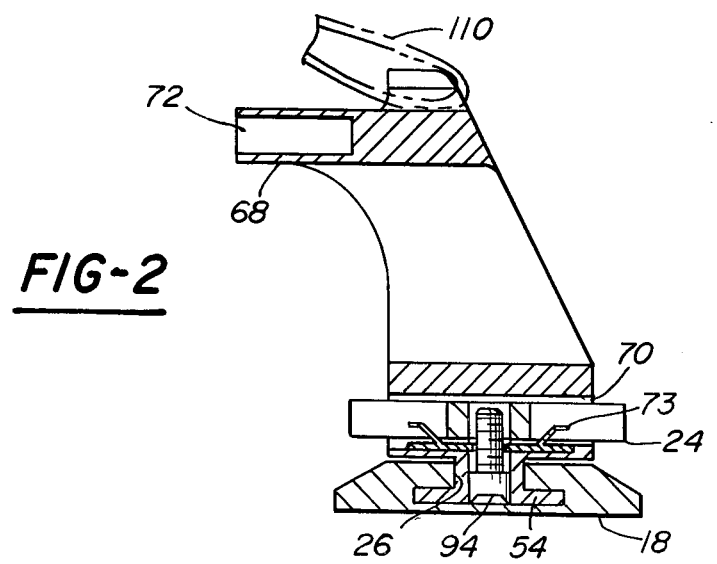
FIG. 2 is a cross-sectional view through the center of the rail receiving bracket following a transverse plane.

A shank 56 projects upwardly from the lower body 54 and is integrally formed therwith. The shank 56 is disposed substantially perpendicular to the lower body 54 and centrally thereof. The shank 56 is coextensive with the lower body 54 along the longitudinal extent thereof. The shank 56 has a width slightly less than that of the slot 30 and projects thereabove, as shown in FIG. 2.

The upper section 44 is integrally formed with the base section 42 and is united therewith at the junction of the shank 56 with the lower end of the upper section 44. The upper section is substantially equal in length to the base 42. As shown in the drawing, the upper section has an irregular configuration and comprises means, generally, denoted at 46 for receiving a cross-strap.

More specifically, the upper section includes a lower end 58. The lower end 58 is configured analogously to that of the upper surface of the slat 14. This is done for load bearing distribution over the entire width of the slat. Upstanding from the lower end are a pair of opposed, wide walls 60, 62 respectively, and a pair of opposed end walls 64, 66 respectively. The side walls and end walls are integrally formed to define a unitary structure for the upper section. A top wall 68 encloses the structure. Of course, the upper section can be a completely enclosed structure, or may exclude a single open-end member or the like.

In the structure shown in the drawing the side wall 62 has a frontal opening 70 formed therein which extends transversely through the upper section. A ledge 72 extends between the end walls and is disposed parallel to the top wall 68 of the upper section for purposes of enclosing the frontal opening 70.

The means 46 comprises a projection extending laterally from the top wall 68 and having a central opening 73 formed therein. The opening 73 is an elongated slot or the like which closely conforms to the cross section of the cross-rail 74. The cross-rail is snugly received by the opening 72 by inserting an end of the rail 74 thereinto. In assembling an article carrier, the rail 74 is supported between a pair of opposed rail receiving brackets 17.

Alternately, the rail can be telescoped over a projection 51 which extends from the rail-receiving bracket as illustrated in FIG. 3. The cross-rail 74 has a hollow end which snugly surrounds the projection 51, and an aperture 57 in the rail near its end is aligned with a threaded aperture 53 in the projection 51. A threaded fastener 55 passing through the aperture in the rail and engaging the threaded aperture 53, secures the cross-rail 74 to the projection 51.

Referring, again, to the drawing, as heretofore noted, in order to set the bracket in any position along the length of the associated track, the present invention further comprises means for releasable locking the rail receiving bracket 17 in position. The locking means comprises a locking key or wedge 84 and a rotatable disc 90 threadingly interconnected to the key.

The key 84 is defined by a solid body 86 and a threaded shaft 88. The shaft 88 has a threaded profile formed about the periphery thereof. The shaft 88 is integrally formed with the solid body 86 and projects outwardly therefrom.

The disc 90 has a central bore 92, the internal periphery of which is provided with a threaded profile. The threaded profile of the shaft is complementary to that of the periphery of the bore 92. Furthermore, the diameter of the bore 92 is substantially equal to that of the shaft. Thus, the shaft and the bore 92 cooperate to define means for threadably interconnecting the disc and the key.

The disc 90 contains a plurality of slits 91 projecting radially inward from the outside diameter and terming a distance from the bore 92. A recess 71 in the opening 70 snugly receives a spring detent 73. The detent 73 has a pair of upward projecting legs 75 which are biased into the slits 91. The surface of the legs contacting the slits 91 curves outward from the slits in an arcuate manner to form a detent which is intermittently engagable as the disc rotates against the detent. The action of the detent prevents the unintended loosening of the bracket which is described in complete detail in copending application Ser. No. 15,327, filed 2-26-79, the disclosure of which is hereby incorporated by reference.

In mounting the rail receiving bracket locking means a pair of registering openings are utilized. As shown in FIG. 2, the lower body 54 has an upwardly directed keyway 94 formed therein forming a recess. The keyway projects upward communicating with the frontal opening to provide means for hand rotating the disc.

It is to be appreciated that the locking means is mounted by inserting the key into the keyway and the disc into the frontal opening, aligning the shaft with the disc opening and, threadably, interconnecting the disc and the shaft by rotating the disc by hand.

It is to be readily appreciated that the means for locking the movable bracket is directly incorporated into the base section hereof. Thus, as the disc is rotated in a first direction, the lower portion of key 86 is urged into engagement with a wall of the guidepath thereby locking the bracket in position. Rotation of the disc in the opposite direction withdraws the lower portion from its engagement with the engaging wall. Optimally, the engaging wall is either the bottom wall of the track or either or both sidewalls. Alternatively, the base section of the bracket can be moved into engagement with the top wall, the base, thus, functioning as the key or wedge itself.

It is to be appreciated that there has been described herein a laterally movable cross-rail bracket for an article carrier that can be readily locked in any desired position along a cross-rail and that the laterally movable tie-down bracket can be releasably locked to the cross rail. Movement of the laterally movable cross-rail bracket along the cross-rail will vary the tension of the strap threaded through the opening in the cross-rail provided therefore.

It should be noted, also, that the article carrier hereof can incorporate load-bearing slats which detachably mount to brackets 17 such as detailed in U.S. Pat. Ser. No. 4,132,335, filed 9-27-77 and entitled "Slideable Bracket for Article Carrier," the disclosure of which is hereby incorporated by reference, other variations can, also, be incorporated hereinto.

Having thus described the invention what is claimed is:

We claim:

1. An article carrier for an automotive vehicle of the type including an elongated slat fixed to the vehicle exterior and extending longitudinally thereof, said slat having an upwardly opening guideway, a bracket having a base portion slidably retained in said guideway, means for adjustably clamping the bracket to the slat, the bracket having an upper portion which includes a cross-rail supporting section extending normally of the slat, and a cross-rail mounted upon the cross-rail supporting section, the improvement comprising:

(a) the cross-rail being of a generally oval cross section and having
 a continuous bottom surface,
 an upper surface including an upwardly opening channel formed by a pair of inwardly extending side walls, said channel extending throughout the length of the cross-rail;

(b) an elastomeric seal member enclosing said cross-rail channel;

(c) the cross-rail supporting section of said bracket being generally of the same oval cross section as the cross-rail and including a pair of slots adapted to receive the inwardly extending side walls of the cross-rail;

(d) a bracket mounted on and slidably adjustable throughout the length of said cross-rail, said bracket including
 a lower portion having a first transverse opening corresponding generally to the oval cross section of the cross-rail and surrounding said rail,
 an upper portion having a second transverse opening adapted to receive an article retaining strap, and
 means coacting with the continuous bottom surface of said cross-rail to releasably clamp said bracket to the cross-rail.

* * * * *